(12) United States Patent
Lilly et al.

(10) Patent No.: US 8,417,368 B2
(45) Date of Patent: *Apr. 9, 2013

(54) METHOD AND APPARATUS FOR SCHEDULING WORK ORDERS IN A MANUFACTURING PROCESS

(75) Inventors: Richard T. Lilly, Hampton Falls, NH (US); David V. Layne, Litchfield, NH (US)

(73) Assignee: Infor (Veenendaal) B.V. (NL)

( * ) Notice: Subject to any disclaimer, the term of this patent is extended or adjusted under 35 U.S.C. 154(b) by 468 days.

This patent is subject to a terminal disclaimer.

(21) Appl. No.: 12/365,261

(22) Filed: Feb. 4, 2009

(65) Prior Publication Data

US 2010/0161098 A1   Jun. 24, 2010

Related U.S. Application Data

(63) Continuation of application No. 11/500,509, filed on Aug. 8, 2006, now Pat. No. 7,519,444, which is a continuation of application No. 10/945,560, filed on Sep. 20, 2004, now Pat. No. 7,089,071, which is a continuation of application No. 09/593,336, filed on Jun. 14, 2000, now Pat. No. 6,801,820, which is a continuation of application No. 09/065,932, filed on Apr. 24, 1998, now Pat. No. 6,088,626, which is a continuation of application No. 08/250,179, filed on May 27, 1994, now Pat. No. 5,787,000.

(51) Int. Cl.
*G06F 19/00* (2006.01)
*G05B 19/418* (2006.01)
*G06Q 10/00* (2006.01)

(52) U.S. Cl.
USPC ........... 700/100; 700/102; 700/106; 700/111; 705/28; 705/29

(58) Field of Classification Search .................... 700/99, 700/100, 101, 102
See application file for complete search history.

(56) References Cited

U.S. PATENT DOCUMENTS

| 3,705,410 A | 12/1972 | Kooy et al. |
| 4,218,616 A | 8/1980 | Loomer |

(Continued)

FOREIGN PATENT DOCUMENTS

WO   WO9713211   4/1997

OTHER PUBLICATIONS

Blackburn, Joe Jr., "Considerations in Choosing Shop Scheduling Algorithms," Production and Inventory Management, 4th Qtr. 1984, pp. 107-125.

(Continued)

*Primary Examiner* — Mohammad Ali
*Assistant Examiner* — Sheela S Rao
(74) *Attorney, Agent, or Firm* — Blank Rome LLP

(57) ABSTRACT

A computerized system for scheduling a plurality of work orders in a manufacturing process. Each work order specifies operations to be performed using a plurality of resources and materials. Data including resource availability information for each resource used in the manufacturing process, material availability information for each material used in the manufacturing process, and work order information is received and stored in a computer. The work order information includes a release date for the work order, a want date for the work order, operations information, and material requirements information. Resource capacity and a start date/time and a finish date/time are assigned to each operation based upon the resource availability information, the material availability information, and the work order information. The assigned resource capacity, the assigned start date/time, and the assigned finish date/time for each operation are displayed on a computer screen in a graphical format.

25 Claims, 11 Drawing Sheets

U.S. PATENT DOCUMENTS

| | | | |
|---|---|---|---|
| 4,336,589 A | 6/1982 | Smith et al. | |
| 4,340,810 A | 7/1982 | Glass | |
| 4,459,663 A | 7/1984 | Dye | |
| 4,509,123 A | 4/1985 | Vereen | |
| 4,588,881 A | 5/1986 | Pejas et al. | |
| 4,621,325 A | 11/1986 | Naftzger et al. | |
| 4,646,238 A | 2/1987 | Carlson, Jr. et al. | |
| 4,697,753 A | 10/1987 | Schippers et al. | |
| 4,783,740 A | 11/1988 | Ishizawa et al. | |
| 4,827,423 A * | 5/1989 | Beasley et al. | 700/96 |
| 4,937,743 A | 6/1990 | Rassman et al. | |
| 5,038,283 A | 8/1991 | Caveney | |
| 5,089,970 A | 2/1992 | Lee et al. | |
| 5,093,794 A | 3/1992 | Howie et al. | |
| 5,101,352 A * | 3/1992 | Rembert | 705/8 |
| 5,128,860 A | 7/1992 | Chapman | |
| 5,136,497 A | 8/1992 | Coe et al. | |
| 5,172,313 A | 12/1992 | Schumacher | |
| 5,193,065 A | 3/1993 | Guerindon et al. | |
| 5,202,837 A | 4/1993 | Coe et al. | |
| 5,216,593 A | 6/1993 | Dietrich et al. | |
| 5,233,533 A | 8/1993 | Edstrom et al. | |
| 5,283,745 A | 2/1994 | Tanaka | |
| 5,285,392 A | 2/1994 | Kyle et al. | |
| 5,291,397 A | 3/1994 | Powell | |
| 5,303,144 A * | 4/1994 | Kawashima et al. | 705/8 |
| 5,325,304 A | 6/1994 | Aoki | |
| 5,334,822 A | 8/1994 | Sanford | |
| 5,375,061 A * | 12/1994 | Hara et al. | 700/101 |
| 5,395,206 A | 3/1995 | Cerny, Jr. | |
| 5,403,147 A | 4/1995 | Tanaka | |
| 5,430,831 A | 7/1995 | Snellen | |
| 5,440,480 A | 8/1995 | Costanza | |
| 5,450,317 A | 9/1995 | Lu et al. | |
| 5,463,555 A | 10/1995 | Ward et al. | |
| 5,485,369 A | 1/1996 | Nicholls et al. | |
| 5,487,143 A | 1/1996 | Southgate | |
| 5,548,518 A | 8/1996 | Dietrich et al. | |
| 5,568,393 A | 10/1996 | Ando et al. | |
| 5,586,021 A | 12/1996 | Fargher et al. | |
| 5,596,502 A | 1/1997 | Koski et al. | |
| 5,600,565 A | 2/1997 | Wagner et al. | |
| 5,630,070 A | 5/1997 | Dietrich et al. | |
| 5,712,989 A | 1/1998 | Johnson et al. | |
| 5,787,000 A | 7/1998 | Lilly et al. | |
| 6,195,590 B1 | 2/2001 | Powell | |
| 6,516,301 B1 | 2/2003 | Aykin | |
| 7,039,595 B1 | 5/2006 | Lilly | |
| 7,519,444 B2 * | 4/2009 | Lilly et al. | 700/100 |

OTHER PUBLICATIONS

Bowman, Robert, "Strategies for International Shipping," Distribution, Oct. 1990, pp. 79-80.

"Common Sense Throughput for CEOs," Lilly Software Associates, Inc., Hampton, NH, approx. publication date Sep. 18, 1998.

Connor, Jon L., "Finite Scheduling It Works If . . . ,"Manufacturing Systems, Aug. 1987, pp. 39-40.

Goldratt et al, The Goal, North River Press, Inc., Great Barrington, MA 1984, pp. 60-61.

Greene, Alice H., "Finite Scheduling—Round Two," The Magazine of Manufacturing Performance, Feb. 1989, pp. 24 & 27.

Klusewitz et al., "Constraint Management Through the Drum-Buffer-Rope System," 1996 IEEE/Semi Advanced Semiconductor Manufacturing Conference, 1996, pp. 7-12.

Kosturiak et al., "Simulation in Production System Life Cycle," Computer in Industry, vol. 38, No. 2, Mar. 1999, pp. 159-172.

McCarthy, S.W. et al., "Medium to Short Term Finite Capacity Scheduling: A Planning Methodology for Capacity Constrained Workshops," Engineering Costs and Production Economics, 19(1990), pp. 189-199.

Miller, Mark, "Don't Let Undependable Supplier Bug You—Five Principles to Help Boost the Rate of On-Time Deliveries," Electronic Buyers' News, 1993, No. 839, Feb. 1, 1993, 2 pages.

Miller, Mark "The Key to Recognition is Teamwork—Ironing Out Conflicts Will Yield Positive Results," Electronic Buyers' News, 1993, No. 865, Aug. 2, 1993, 2 pages.

Potvin et al., "A Parallel Route Building Algorithm for the Vehicle Routing and Scheduling Problem with Time Windows," Centre de recherche sur les transports—Publication #729, Oct. 1990, Revised Jul. 1991-Apr. 1993, Montreal, 1-18.

Raia, Ernest, "JIT Delivery: Redefining On-Time," Purchasing, vol. 109, No. 3, p. 64, Sep. 13, 1990, 4 pages.

Richardson, Helen, "T&D Recognizes Excellence in Logistics," Transportation & Distribution, vol. 32, No. 12, Dec. 1991, 5 pages.

Steinberg, Earl et al., "A Requirements Planning System for the Space Shuttle Operations Schedule," Journal of Operations Management, vol. 1, No. 2, Nov. 1980, pp. 69-76.

Zurier, Steve, "Delivering Quality Customer Service: Distributors Striving for Zero Defects Have Found that to Make the Quality Process Work, They Must Involve Every Employee in the Company," Industrial Distribution, vol. 78, No. 3, p. 30, Mar. 1989, 4 pages.

* cited by examiner

METHOD AND APPARATUS FOR SCHEDULING WORK ORDERS IN A MANUFACTURING PROCESS

RELATED APPLICATIONS

This application is a continuation of U.S. patent application Ser. No. 11/500,509, filed Aug. 8, 2006 (now U.S. Pat. No. 7,519,444); which is a continuation of U.S. patent application Ser. No. 10/945,560, filed Sep. 20, 2004 (now U.S. Pat. No. 7,089,071); which is a continuation of U.S. patent application Ser. No. 09/593,336, filed Jun. 14, 2000 (now U.S. Pat. No. 6,801,820); which is a continuation of U.S. patent application Ser. No. 09/065,932, filed Apr. 24, 1998 (now U.S. Pat. No. 6,088,626); which is a continuation of U.S. patent application Ser. No. 08/250,179, filed May 27, 1994 (now U.S. Pat. No. 5,787,000).

BACKGROUND OF THE INVENTION

The present invention relates to a computerized system for scheduling work orders for manufacturing products in a manufacturing process.

Prior to the introduction of computerized scheduling systems, the scheduling of work orders in a manufacturing facility was performed manually. The person responsible for determining the work schedule manually assigned the work to be performed to specific dates. The manual scheduling process involved determining what work has to be performed and the time, materials, and resources (i.e., machines, workers, tools, etc.) required to perform it, as well as other information which influenced the schedule, such as which work was more important than other work. This process is costly, very tedious and often inaccurate. The frequency with which the scheduling process must be performed contributes to the difficulty of obtaining timely, accurate manual scheduling.

As commercial computer systems became available, manufacturers began using computerized systems that assisted in the storage and retrieval of information relevant to the scheduling of work in a manufacturing facility. In the late 1950's and during the 1960's, efforts were made to implement Material Requirements Planning or MRP. MRP was limited in scope to dealing only with material requirements (i.e., which parts or materials were needed and when). These early computerized systems were not capable of scheduling operations based upon the availability of materials or resource capacity.

During the 1970's and 1980's, many commercially available systems were created which provided more comprehensive MRP, and it was eventually renamed Manufacturing Resource Planning. The new MRP dealt with additional problems, such as forecasting, inventory management, shop floor control, engineering, and change management. Some of these systems dealt with the capacity of the plant to perform the work. One such approach was called rough-cut capacity planning and, as the name suggests, it provided a crude estimate of the capacity needed to satisfy work requirements. Rough-cut capacity planning determined the capacity needed, but was not capable of scheduling work orders based on capacity limits.

Other systems for scheduling work orders in a manufacturing facility relied on a method of scheduling that compared the total hours of capacity to the total hours of load from operations. Such systems were not capable of "event-oriented" scheduling, i.e., assigning a particular event or operation to a particular resource for a particular time period.

It was not until the mid-1980's that a computerized event-oriented scheduling system was developed that was capable of scheduling work orders and the operations required to carry out the work orders, taking into account the finite capacity of the various resources needed for the manufacturing process, i.e., finite scheduling. ProfitKey, a New Hampshire-based company, developed one of the first such finite scheduling systems available to the market. Using the ProfitKey scheduler, a manufacturer could determine the start and finish date of work orders and their operations based upon resource capacity and availability. A similar system was developed by Lilly Software Associates, Inc. and marketed as part of the VISUAL Manufacturing™ system beginning in early 1993.

However, neither the ProfitKey system nor the early 1993 version of the VISUAL Manufacturing™ system was capable of taking the availability of materials into account in determining the scheduling of work orders. In addition, the ProfitKey system and the early 1993 version of the VISUAL Manufacturing™ were both limited to a single resource capacity calendar for all resources in the system, and neither system was capable of generating multiple schedules based on different assumptions regarding resource capacity for individual resources. Further, the ProfitKey system was not capable of scheduling multiple dissimilar resources concurrently based upon user specifications.

Other scheduling systems include Microsoft Project™ and Norton's Timeline from Symantec. These programs are capable of storing and retrieving information about a project defined by the user using a method consistent with Critical Path Method (CPM) theory. These tools are designed to handle projects that have definable events that are interdependent, similar to a single work order in a manufacturing process. These systems are not, however, capable of managing hundreds of work orders at a time as is typical in most manufacturing plants.

No prior art system is capable of scheduling a plurality of work orders or operations in a manufacturing facility, using a finite, event-oriented scheduling process with the added feature of taking into account the availability of materials that are used in the manufacturing process.

OBJECTS OF THE INVENTION

Therefore, it is an object of the present invention to provide a computerized system for performing accurate and timely scheduling of work orders in a manufacturing facility.

It is a further object of the invention to provide a method and means for scheduling work orders for manufacturing products in a manufacturing process, wherein each operation in the work order is assigned resource capacity, a start date/time, and a finish date/time based upon the resource and material requirements of the operation and the availability of resource capacity and materials in the manufacturing facility.

It is still a further object of the invention to provide a method and means for determining the best fit of the operations of each work order in the schedule based upon both resource availability and material availability.

It is still a further object of the invention to provide a scheduling system which includes a method and means for defining variable resource capacity as a function of the dates and times in the calendar individually for each resource used in the manufacturing facility.

It is still a further object of the invention to provide a scheduling system which includes a method and means for creating multiple schedules based on different resource capacity calendars for comparison purposes.

It is still a further object of the invention to provide a scheduling system which includes a method and means for scheduling operations at more than one dissimilar resource simultaneously.

It is still a further object of the invention to provide a scheduling system which includes a method and means for allowing the user to specify a minimum and maximum resource capacity needed to perform each operation being scheduled, in order to optimize utilization of each resource in the manufacturing facility.

These and other objects and advantages of the invention will be apparent from the following detailed description of the invention and drawings.

SUMMARY OF THE INVENTION

In accordance with the present invention, a computerized system is provided for scheduling a plurality of work orders in a manufacturing process. Each work order to be scheduled specifies a set of operations to be performed using a plurality of resources and materials. The method of the invention includes receiving data in a computer, the data including resource availability information for each resource used in the manufacturing process, material availability information for each material used in the manufacturing process, and work order information. The work order information includes a release date for the work order, a want date for the work order, operations information, and material requirements information. The operations information includes the identity and sequence of operations to be performed for the work order, the identity of the resources needed to perform each operation, a minimum resource capacity needed to perform each operation, and the time needed to perform each operation. The materials information includes the identity of the materials needed to perform each operation and the quantity of each material needed for the operation. The method of the invention further includes the steps of assigning resource capacity and a start date/time and a finish date/time to each operation based upon the resource availability information, the material availability information, and the work order information. The method of the invention also includes the step of displaying on a computer screen the assigned resource capacity, the assigned start date/time, and the assigned finish date/time for each operation in a graphical format.

The system of the invention includes means for receiving data in a computer, the data including resource availability information for each resource used in the manufacturing process, material availability information for each material used in the manufacturing process, and work order information. The work order information includes a release date for the work order, a want date for the work order, operations information, and material requirements information. The system of the invention further includes means for assigning resource capacity and a start date/time and a finish date/time to each operation based upon the resource availability information, the material availability information, and the work order information. The system of the invention also includes means for displaying on a computer screen the assigned resource capacity, the assigned start date/time, and the assigned finish date/time for each operation in a graphical format.

DEFINITIONS

A "work order" order is a request to manufacture one or more distinct parts in a manufacturing facility. Such parts may be consumed either by the customer who ordered the parts or by other work orders within the manufacturing facility, as in the case of a subassembly.

A "part" is any distinct unit that can be manufactured as an end product or an intermediate product or subassembly.

An "operation" is a step in the process for manufacturing a distinct part according to a work order. Each operation in a work order is sequenced so that it follows a preceding operation (or is the first), and comes before a succeeding operation (or is the last).

A "material" is any material or part that is consumed by the manufacturing process or added to the part being manufactured during the manufacturing process. A material may be a subassembly which is an intermediate product used in the manufacturing process. A material may be identified by an inventory part number.

A "resource" is something that is needed to perform an operation, but which is not directly consumed in the performance of the operation. Examples of a resource include workers, machines, and tools. A resource may be internal or external to the manufacturing facility. An external resource would be, for example, an outside vendor or an outside service provider.

A "date/time" is a specification of a date (month, day, and year) and a time of day.

BRIEF DESCRIPTION OF THE DRAWINGS

FIGS. 8-12 are flow charts showing the steps for implementing the scheduling system of the present invention.

DETAILED DESCRIPTION OF THE INVENTION

The scheduling system of the present invention may be used in any manufacturing facility. The system may be most useful in a facility for manufacturing discrete products, such as a facility that manufactures products according to individualized customer specifications.

The scheduling system may be used to schedule all work orders that have been accepted by the manufacturer. The system may also be used to determine a proposed schedule and/or a proposed delivery date for a potential work order in response to an inquiry from a customer or other interested person.

The scheduling system of the present invention may be implemented using a variety of personal computers. According to a preferred embodiment of the invention, the scheduling system is implemented using an IBM-compatible computer having not less than 8 megabytes of random access memory (RAM), a 486DX or higher Intel™ microprocessor running at 33 megahertz or higher, and sufficient hard disk space to store the software programs used to implement the invention, the output from the scheduling program, as well as the input data such as the resource availability information, material availability information, work order information, operations information, and material requirements information.

Figure 1:
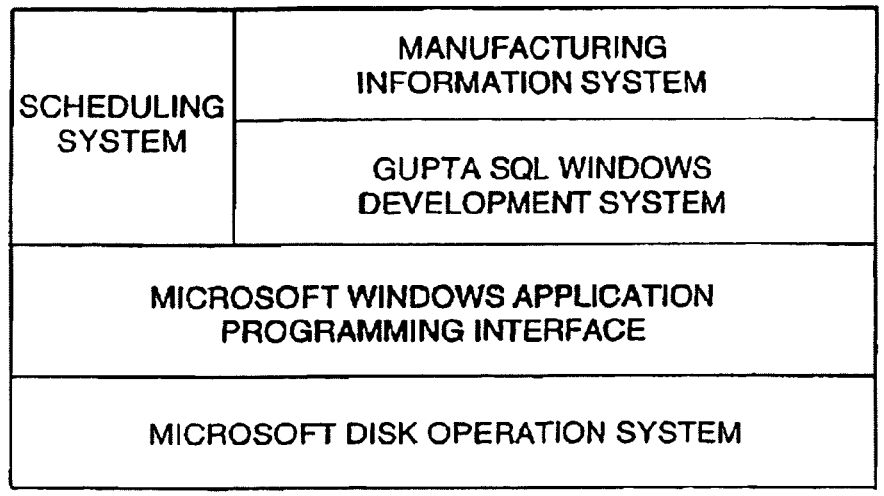
FIG. 1 is a block diagram of the software components used to implement a preferred embodiment of the scheduling system, as they relate to each other.

The scheduling system of the present invention may be implemented using a variety of programming languages and operating systems. According to a preferred embodiment of the invention, the scheduling system is implemented as a Windows Dynamic Link Library using Gupta Corporation's SQLWindows™ Client-Server Application Development System and Microsoft Visual C++™, both of which run on a Microsoft® Windows™ Version 3.1-based IBM-compatible computer system. FIG. 1 illustrates in a graphical format the relationship between the software components used to implement a preferred embodiment of the scheduling system of the invention. As illustrated in FIG. 1, a preferred embodiment of the invention interfaces with a manufacturing information system, which exchanges certain data with the scheduling system, such as material availability information.

The capabilities and implementation of the aforementioned programming languages and operating systems are explained in the following texts and manuals, which are hereby incorporated by reference: SQLWindows Technical Reference Manual, Volumes 1 and 2, Gupta Corporation, 20-1205-1003, 20-1206-1001; SQLWindows Function Reference Manual, Volumes 1 and 2, Gupta Corporation, 20-2215-1003, 20-2217-1001; SQLBase Language Reference Manual, Gupta Corporation, 20-2107-1002; SQLBase C Application Programming Interface Reference Manual, Gupta Corporation, 20-2111-1002; Microsoft Windows 3.1 Programmer's Reference, Volumes 1, 2, 3 and 4, Microsoft Corporation; Microsoft Visual C++ Programmer's Guide, Microsoft Corporation; and Microsoft Visual C++ Reference, Volumes 1 and 2, Microsoft Corporation. Additional references which may be helpful are listed bibliographically in the foregoing texts and manuals.

According to the scheduling system of the present invention, certain data required to schedule a work order is received in a computer. This data includes resource availability information, material availability information, work order information, operations information, and material requirements information. Each of these types of data is described in detail below:

"Resource availability information" includes the identity of each resource used in the manufacturing process, a calendar specifying the quantity of each resource that is available for use at a particular date/time independent of previously scheduled operations (the "resource capacity calendar"), and the capacity for each resource that has been assigned to previously scheduled operations (also referred to as "load"). The resource availability information is updated each time that an operation is scheduled by the system in order to reflect the load on each resource imposed by the scheduled operation.

"Material availability information" includes the identity of each material used in the manufacturing process, the dates when each material is available, and the quantity of each material available on each date. The material availability information may also include the lead time necessary to obtain an additional quantity of each material. The material availability information is updated each time that an operation is scheduled by the system in order to reflect the material demand in the time period the material is needed for the scheduled operation. In a preferred embodiment of the invention, selected material availability information is displayed on a computer screen.

Figure 3:
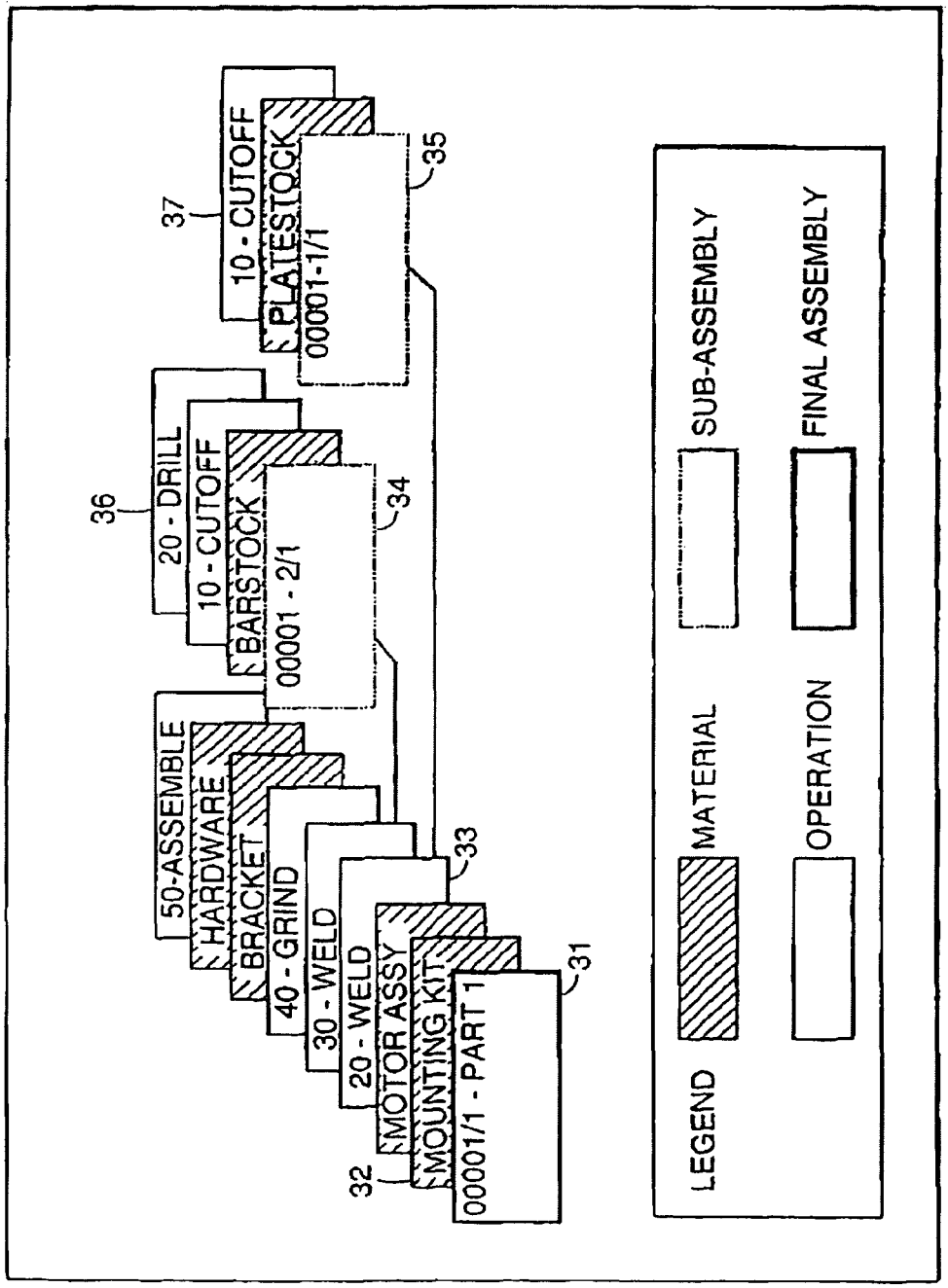
FIG. 3 illustrates a preferred embodiment of a screen display showing a multiple level work order.

"Work order information" includes the release date for the work order (i.e., when work should commence) and the want date for the work order (i.e., when work must be complete). Work order information also includes certain operations information and material requirements information. Work order information may also include the identity of the part to be manufactured, the quantity of the part to be manufactured, and a relative priority for the work to be performed. In a preferred embodiment of the invention, selected work order information is displayed on a computer screen, preferably in the form of an acyclic directed graph. FIG. 3 illustrates a preferred embodiment of a screen display showing selected work order information.

"Operations information" includes the identity of the operations defined by a work order, the sequence in which the operations are to be performed, the identity of the resource(s) at which each operation is to be performed, and a minimum resource capacity needed to perform each operation. The resources identified for each operation include a main resource, and optionally two auxiliary resources, namely a setup resource and a run resource. The "operations information" also includes the period of time needed to perform the operation, which may include the period of time need to set up the resource(s) needed to perform the operation ("setup time") and the period of time needed to run the operation, preferably expressed per unit of output from the operation or as a number of output units in a given period of time ("run time"). The "operations information" may also include the scrap or yield from the operation, preferably expressed as the number of output units from the operation per unit of input in percent; a fixed quantity of scrap that will be discarded from the operation; a minimum quantity of output units required to be completed before beginning the next operation; the period of time required to physically transfer the output units to the next succeeding operation ("transfer time"); and/or a maximum resource capacity that could be used to perform the operation, if such capacity were available.

Figure 4:
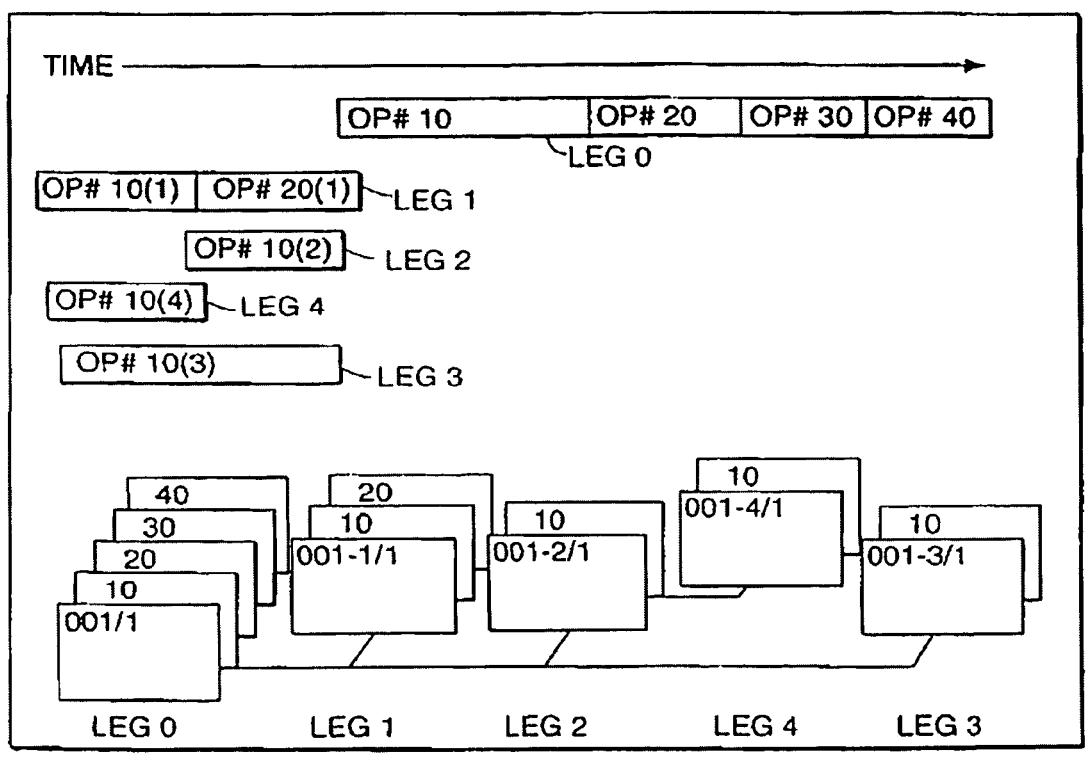
FIG. 4 is a graphical representation of a multiple level work order, omitting the material requirements.

The sequence of operations defined by a work order may be single or multiple level. A single level work order has a linear sequence of operations. A multiple level work order has a branched sequence of operations, whereby each branch of the sequence contains a subset of operations for manufacturing an intermediate product or subassembly that is used to manufacture the final product. FIG. 3 shows a graphical illustration of a multiple level work order, including end product 31, material requirement 32, operation 33, and intermediate products (or subassemblies) 34 and 35. Each subset of operations is referred to as a "leg" of the work order. For example, the work order shown in FIG. 3 has legs 36 and 37. For multiple level work orders, the "operations information" includes, as part of the sequence of operations, the leg of the work order to which each operation belongs. In a preferred embodiment of the scheduling system, operations that belong to separate legs of a multiple level work order may be scheduled concurrently. For example, FIG. 4 shows a graphical representation of a multilevel work order, omitting the material requirements for the work order. The top part of FIG. 4 illustrates the concurrent scheduling of operations in a multiple level work order. In addition, even with a single level work order, the user may specify that two or more operations be scheduled concurrently.

"Material requirements information" includes the identity of the materials needed for an operation and the quantity of the material needed for an operation. The quantity of the materials needed for an operation is preferably expressed either per unit of input to the operation or per unit of output from the operation. The materials information may also include a scrap rate (in addition to the scrap imposed by the operation definition), a fixed quantity of scrap (in addition to the scrap imposed by the operation definition), the dimensions of a material part needed for an operation, and/or the unit of measure for the quantity expression (which may need to be converted to another unit of measure). Ultimately, the various quantity expressions are reduced to a specific quantity, in the stock keeping unit of measure, of the part which is required.

The scheduling system of the present invention assigns resource capacity, a start date/time, and a finish date/time to each operation in the work order being scheduled based upon the resource availability information, the material availability information, and the work order information. The system schedules an operation for a date and time when both the necessary resource capacity is available and the necessary materials are available. The preferred means for implementing the assignment of resource capacity, start date/time, and finish date/time is described in detail below:

Resources can have one or more units of capacity. Each unit of capacity corresponds to a worker, machine, tool, or other item or device which performs work on an operation. According to the invention, the system user can define the capacity of each resource that is used in the manufacturing process as a function of the dates and times in a calendar. This is called the "resource capacity calendar." If, for example, the resource is machine operators, the user may define the capacity as being one or more machine operators for a given time period. The "resource capacity calendar" is independent of load (i.e., the capacity that has been assigned to scheduled operations). When scheduling an operation, however, the system takes into account both the resource capacity calendar and the load from previously scheduled operations.

As part of the work order, the user specifies the resource capacity that is required to perform a particular operation. If more than one person or machine is required to work on the same operation at the same time, a minimum resource capacity of more than one unit of capacity may be specified for a given operation. If it would be desirable, but not necessary, for more than one person or machine to work on the same operation at the same time, then a maximum resource capacity may also be specified. In that event, the maximum resource capacity will be assigned to the operation, if such capacity is available. Thus, by specifying a maximum resource capacity, the user may shorten the overall time required to perform an operation by utilizing more than the minimum capacity.

Figure 5:
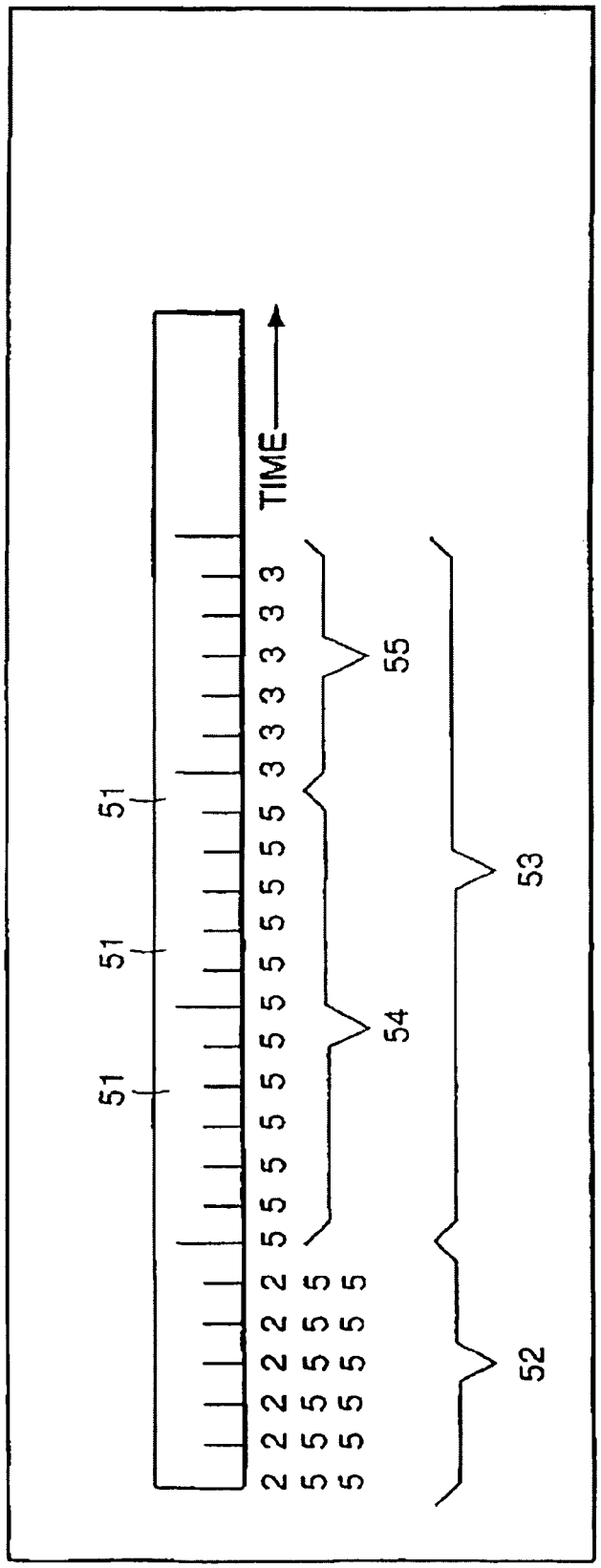
FIG. 5 is a graphical representation of a capacity vector.

According to a preferred embodiment of the scheduling system of the invention, the resource capacity calendar is divided into distinct units of time called notches. A notch is a specific length of time, for example, ten minutes or six notches per hour. The system uses a "capacity vector" to represent the time frame of the resource capacity calendar. FIG. 5 shows a graphical representation of a capacity vector. The capacity vector is divided into notches 51. For example, a two-year time frame contains 17,520 hours or 105,120 notches. Associated with each notch in the capacity vector is a designation of the capacity of the resource that is available during the time period represented by the notch, i.e., the number of simultaneous operations that may be scheduled in the notch. A constant, for example, 255 (the maximum integer represented by a single byte), designates a shutdown notch. A shutdown notch represents a time period during which the resource is not being operated, for example, because the manufacturing plant is closed. All other values designate a running notch. A running notch can be available or unavailable. An available notch is one which has available capacity, and an unavailable notch is one which has no available capacity.

For example, FIG. 5 shows a portion of a capacity vector for machine operators. The first six notches 52 are shutdown notches, indicating that the machine operators are not working during the hour represented by these notches. The next eighteen notches 53 in the capacity vector are running notches. Twelve of these notches 54 each have five units of available capacity, and six of these notches 55 each have three units of available capacity. In other words, there are five machine operators available during the two hours represented by the middle twelve notches in the capacity vector, and three machine operators available during the one hour represented by the last six notches in the capacity vector.

Figure 6:
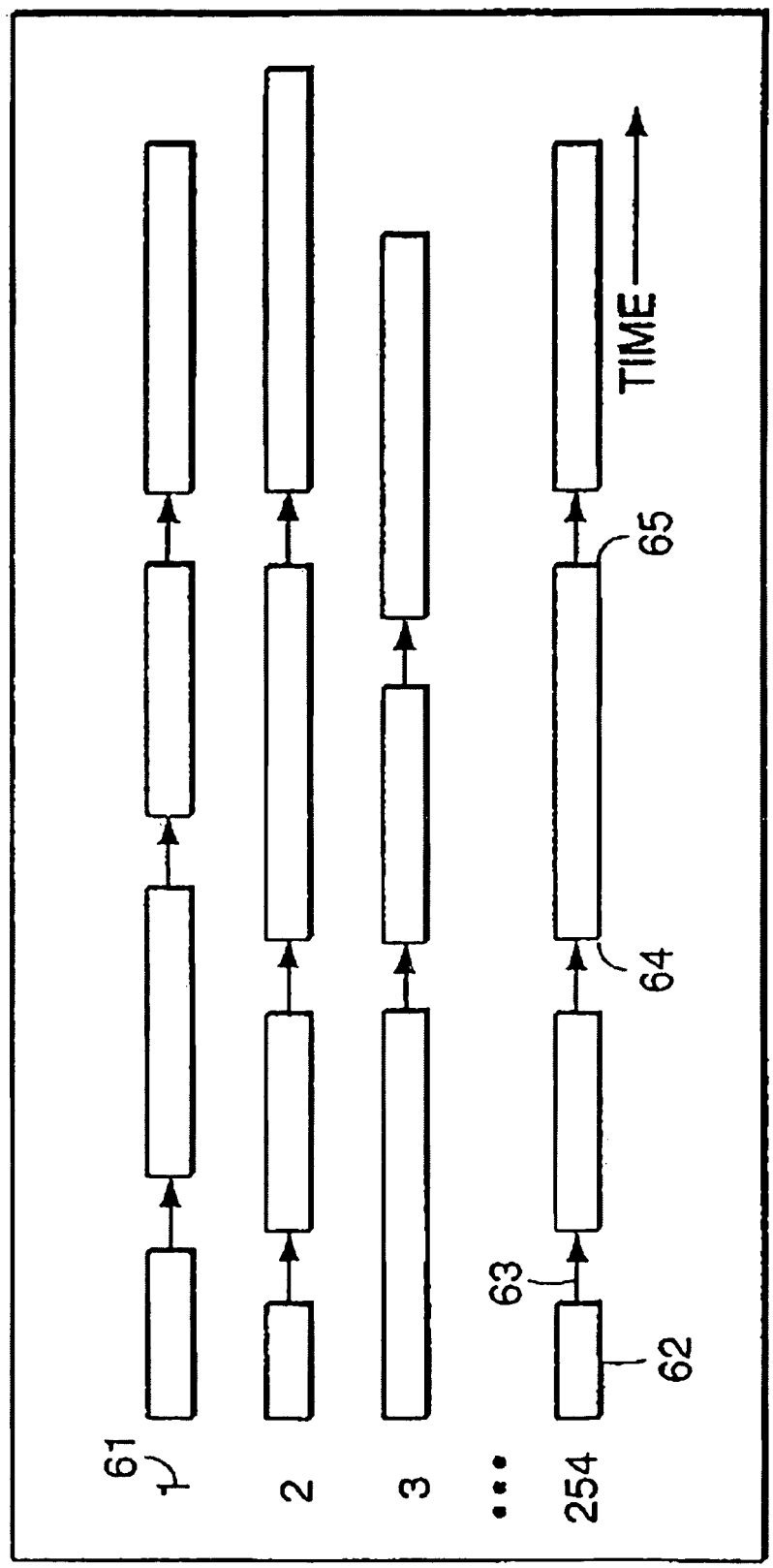
FIG. 6 is a graphical representation of a load vector.

According to a preferred embodiment of the scheduling system of the invention, the capacity vector does not reflect the capacity that has been assigned to previously scheduled operations. Rather, the system records usage of capacity or load in the form of a "load vector" which includes a list of operations that have been scheduled at each resource. FIG. 6 shows a graphical representation of a load vector. Each number 61 along the y-axis in FIG. 6 indicates a particular unit of capacity, e.g., a particular machine operator. Time is represented along the x-axis. Each bar 62 in FIG. 6 represents the time assigned to scheduled operations, and the arrows 63 between each bar 62 represent unassigned time. The space to the left of the last bar 62 for a given unit of capacity also represents unassigned time. Thus, the left end 64 of each bar 62 represents the start date/time for an operation, while the right end 65 of each bar 62 represents the finish date/time for an operation.

According to a preferred embodiment of the scheduling system of the invention, an operation is scheduled in a given set of notches only if all notches in the set are both adjacent and available. Two notches are considered adjacent if they are separated by zero or more shutdown notches, but not if they are separated by an unavailable notch. A notch is available if there is at least one unit of capacity which has not been previously assigned to another operation. In order to determine whether a notch is available, the system consults both the capacity vector (FIG. 5) and the load vector (FIG. 6). Units of capacity to which no operation has been assigned are available for assignment to subsequently scheduled operations requiring that resource.

In addition to resource capacity, the scheduling system of the present invention also checks material availability when scheduling an operation. According to a preferred embodiment of the scheduling system of the present invention, material availability is expressed in terms of supply and demand for each material used in the manufacturing process. Supply is an expression of when a material will be received in inventory, and how much or how many, in terms of the stock unit of measure, will be received. Thus, supply is a list of quantities and dates listed, for example, in sequence by date. Demand is an expression of when a material is needed to perform scheduled operations, and how much or how many, in terms of the stock unit of measure, is/are needed. Thus, demand is a list of quantities and dates listed, for example, in sequence by date. Material availability is determined by netting the demand and supply lists. In a preferred embodiment of the scheduling system, the system first determines a proposed start date for an operation. The system then nets the supply and demand for the material(s) required for the operation in order to determine the quantity of the material(s) available on the proposed start date/time. If this quantity satisfies the material requirement for the operation, then the operation may be scheduled for the proposed start date/time. If, on the other hand, this quantity does not satisfy the material requirement for the operation, then additional material must be obtained, and the start date/time may be rescheduled, taking into account the lead time necessary to obtain an additional quantity of the material. If the lead time is greater than the difference between the current date/time and the proposed start date/time, then the system adds the excess to the proposed start date/time to determine the start date/time. If, on the other hand, the lead time is less than or equal to the difference between the current date/time and the proposed start date/time, then the operation is scheduled for the proposed start date/time.

According to a preferred embodiment of the invention, the scheduling system may operate in at least two different modes: sequential scheduling and global scheduling. In the sequential scheduling mode, the system schedules each work order as it is entered in the system, leaving the assigned resource capacities, the assigned start dates/times, and the assigned finish dates/times for all previously entered work orders in place. In this mode, each successively entered order is de facto given the lowest priority. In the global scheduling mode, on the other hand, the system reschedules all previously entered work orders in order of priority each time that a new work order is entered in the system. All work orders are automatically assigned the same priority when entered, unless the user sets a different priority. Thus, in the global scheduling mode, all work orders in the system are rescheduled in the order of: (1) work order want date, if no work order priority is specified; or (2) work order priority and want date within the same priority level, if a work order priority is specified. The sequence in which work orders are scheduled ultimately determines the schedule. Available capacity is assigned to the first work order in the sequence. Any remaining capacity is assigned to the second work order in the sequence, and so on. Thus, the global scheduling mode results in the optimum schedule because work orders are scheduled in order of want date and/or priority.

According to a preferred embodiment of the scheduling system of the invention, after the sequence in which work orders will be scheduled is determined, the system processes each work order one at a time in the determined sequence. Within each work order, the operations are scheduled in the backward direction, starting with the last or latest-in-time operation and/or in the forward direction, starting with the first or earliest-in-time operation. For example, the sequence of operations in the forward direction for the multiple level work order shown in FIG. 4 would be:

10(4), 10(2), 10(1), 20(1), 10(3), 10(0), 20(0), 30(0), 40(0), and the sequence of operations in the backward direction would be:

40(0), 30(0), 20(0), 10(0), 10(3), 20(1), 10(1), 10(2), 10(4), where the first numeral designates the operation and the numeral in parentheses designates the leg of the work order to which the operation belongs.

Figure 2:
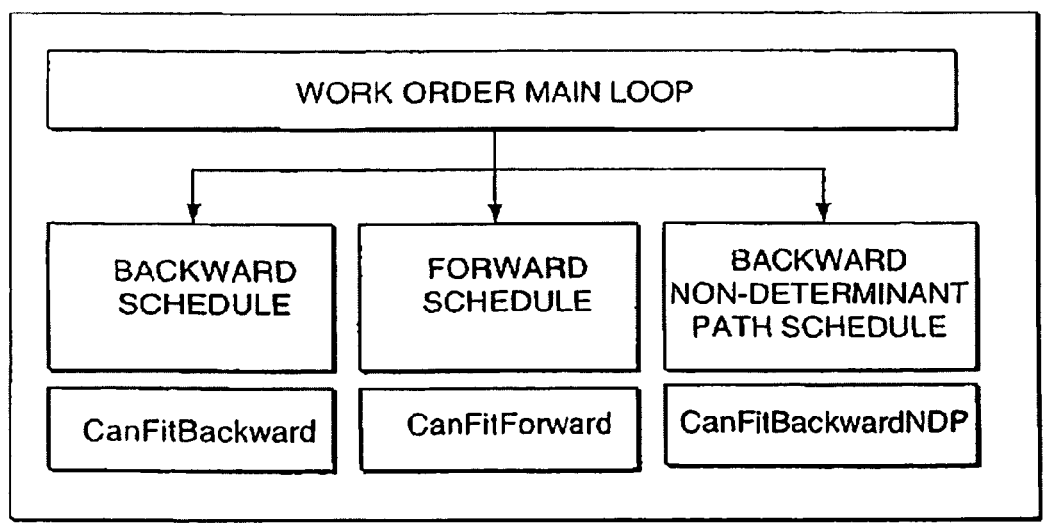
FIG. 2 is a block diagram of particular routines within the scheduling system and their relationship to each other.

According to a preferred embodiment of the invention, the scheduling system initially schedules all operations of a work order in the backward direction. If backward scheduling results in a schedule in which no operations are scheduled prior to the current date, then the resulting schedule is saved and displayed. If the result of backward scheduling exceeds the current date, then forward scheduling is performed. After scheduling the operations of a work order in the forward direction, the system differentiates between "determinate" and "non-determinate" operations and reschedules the non-determinate operations, if possible. FIG. 2 is a block diagram illustrating these scheduling routines and their relationship to each other.

In a single level work order, all operations are determinate. A multiple level work order, on the other hand, has both determinate and non-determinate operations. A determinate operation is one that is on the path of operations which define the longest series of operations, in terms of the length of time from the earliest start date/time to the latest finish date/time, in view of the start dates/times and finish dates/times of all operations in the work order as presently scheduled. This is similar to the concept of a critical path. A sequence of operations may become determinant when one or more operations in the sequence is delayed by the unavailability of resource capacity. In a preferred embodiment of the scheduling system of the invention, after forward scheduling, the system reschedules all non-determinate operations, assigning the latest possible start date/time to each operation. The purpose of this rescheduling is to achieve an optimum schedule which minimizes work in process.

Figure 8:
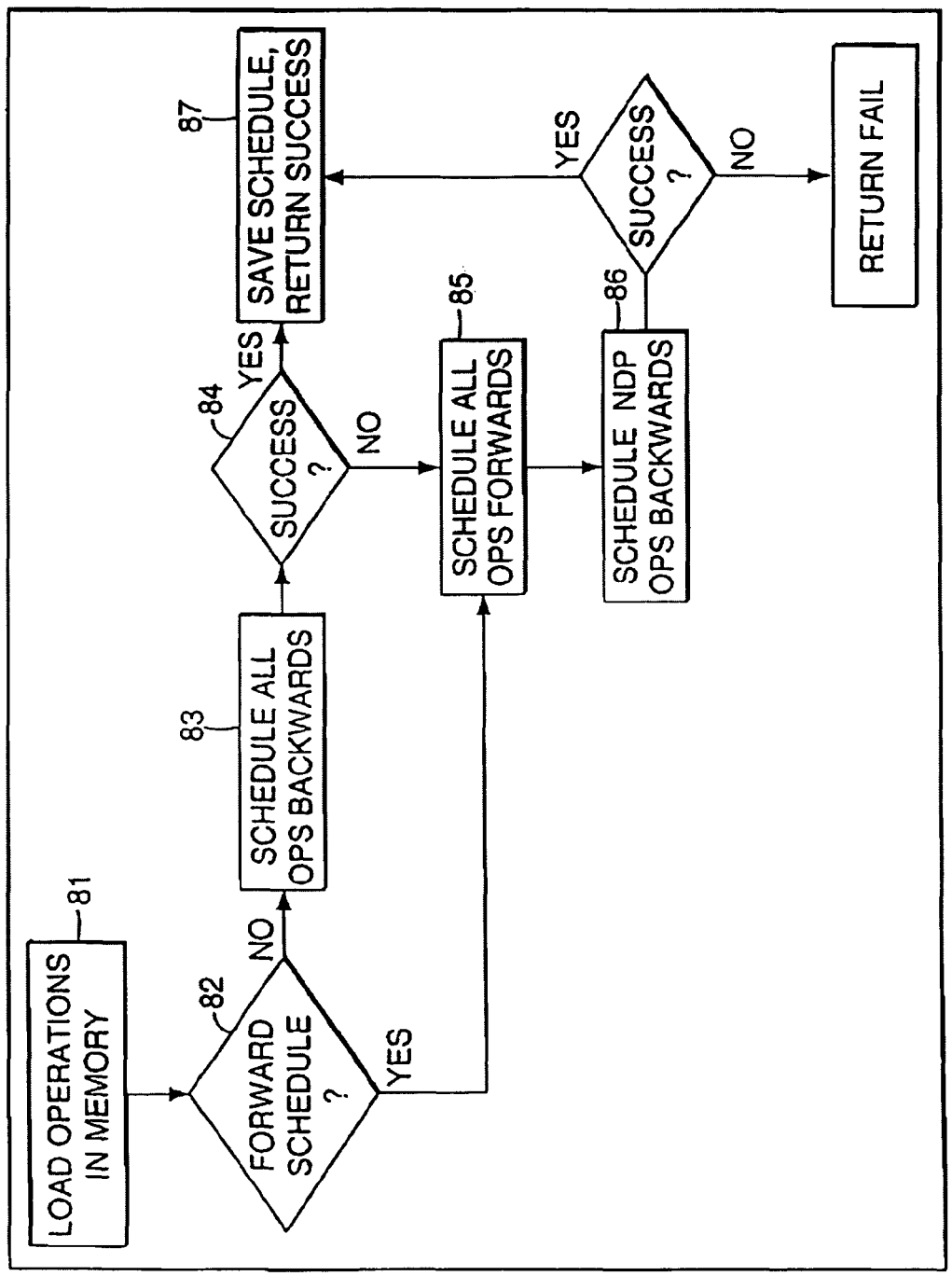
FIG. 8 illustrates logical steps included in a computer program for implementing an embodiment of the scheduling system of the present invention.

The logical steps contained in a computer program for implementing a preferred embodiment of the scheduling system of the invention are described in detail below with reference to the flow charts set forth in FIGS. 8-12:

Scheduling a Single Work Order (FIG. 8)

1. LOAD THE WORK ORDER INTO MEMORY (FIG. 8, BLOCK 81)
2. IF USER SPECIFIES ONLY FORWARD SCHEDULING, SKIP TO STEP 5 (FIG. 8, Block 82)
3. TRAVERSE THE OPERATIONS OF THE WORK ORDER IN THE BACKWARD DIRECTION (FIG. 8, BLOCK 83) (see further explanation below)
4. IF STEP 3 RESULTS IN A SCHEDULE IN WHICH NO OPERATION IS SCHEDULED PRIOR TO THE CURRENT DATE, THEN GO TO STEP 8 (FIG. 8, BLOCK 84)
5. TRAVERSE THE OPERATIONS OF THE WORK ORDER IN THE FORWARD DIRECTION (FIG. 8, BLOCK 85) (see further explanation below)
6. DETERMINE WHICH OPERATIONS OF THE WORK ORDER ARE NON-DETERMINANT; TRAVERSE THE OPERATIONS OF THE WORK ORDER IN THE BACKWARD DIRECTION AND RESCHEDULE ONLY THE NON-DETERMINANT OPERATIONS (FIG. 8, BLOCK 86)
7. SAVE THE RESULTS (FIG. 8, BLOCK 87)

Figure 9:
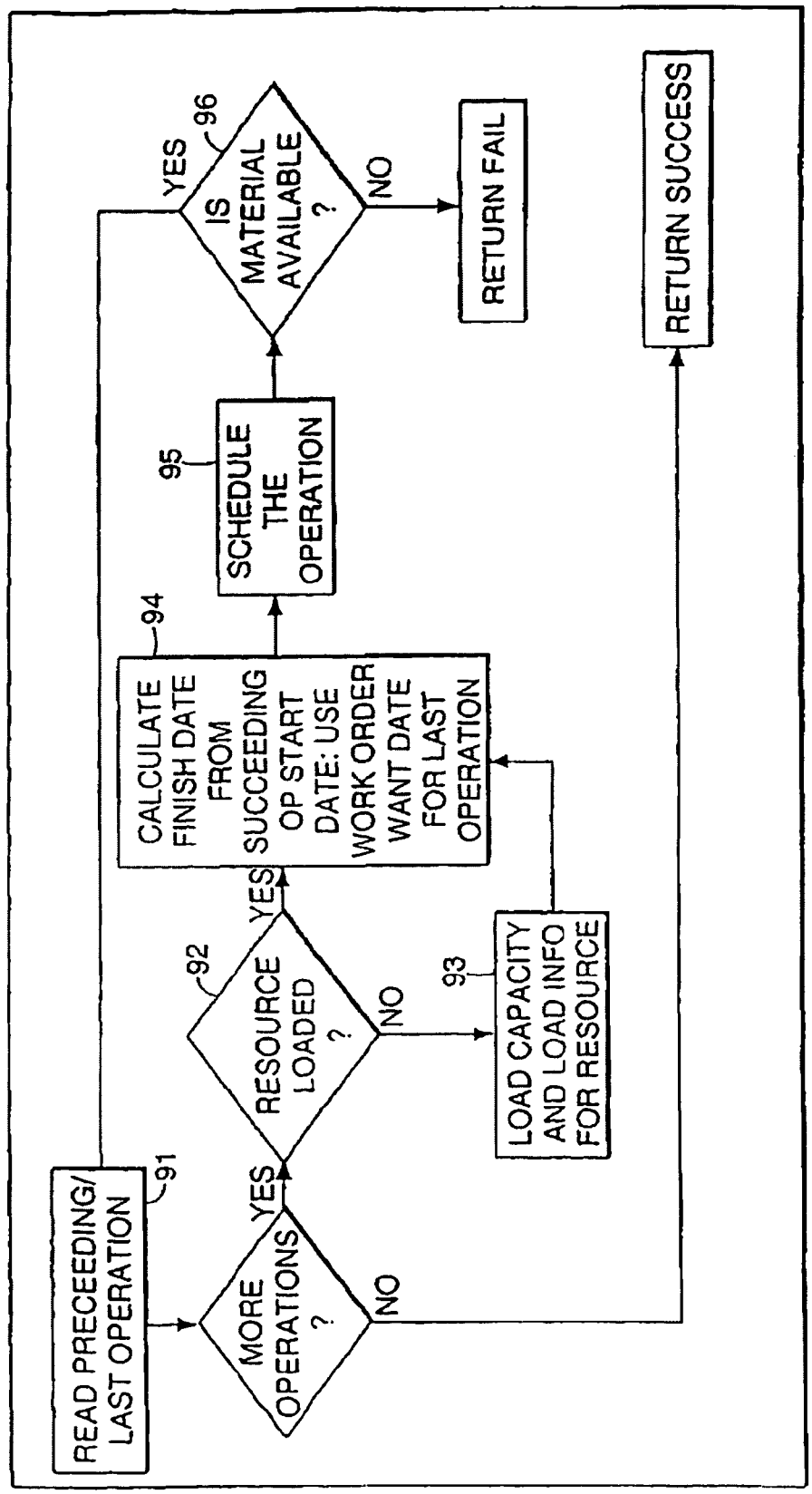
FIG. 9 illustrates additional logical steps included in a computer program for implementing an embodiment of the scheduling system of the present invention.
Figure 10:
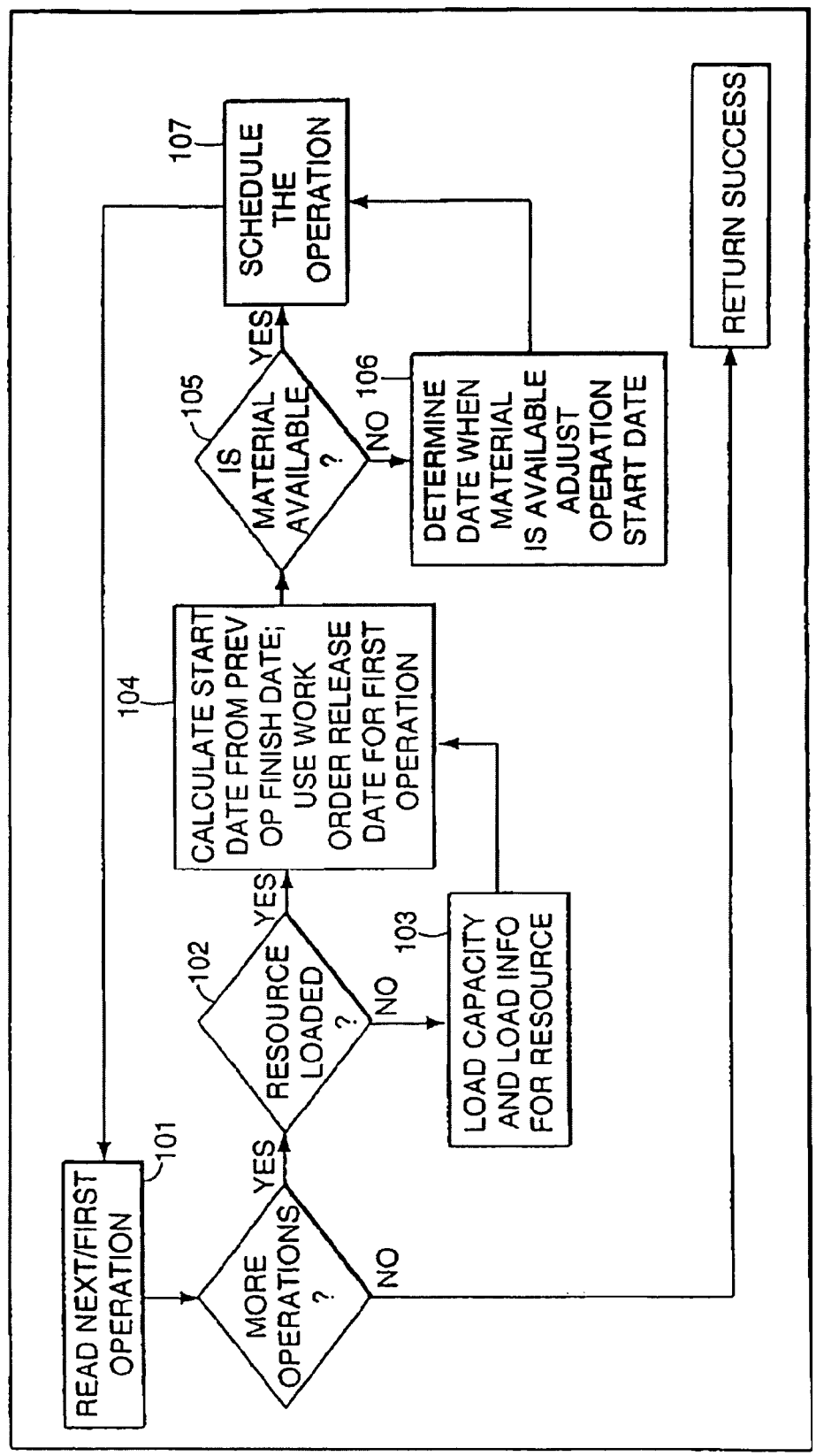
FIG. 10 illustrates additional logical steps included in a computer program for implementing an embodiment of the scheduling system of the present invention.
Figure 11:
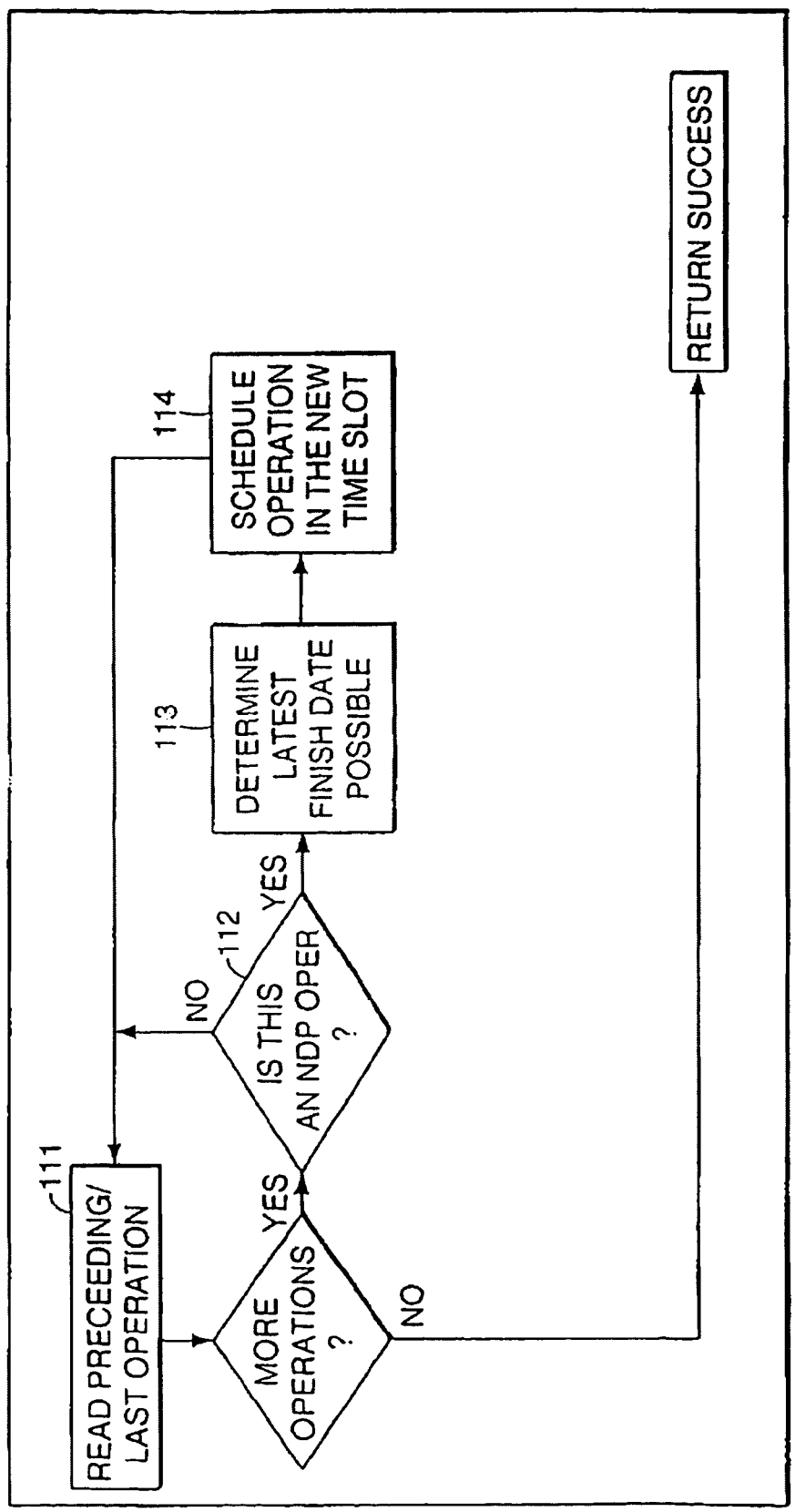
FIG. 11 illustrates still further logical steps included in a computer program for implementing an embodiment of the scheduling system of the present invention.
Figure 12:
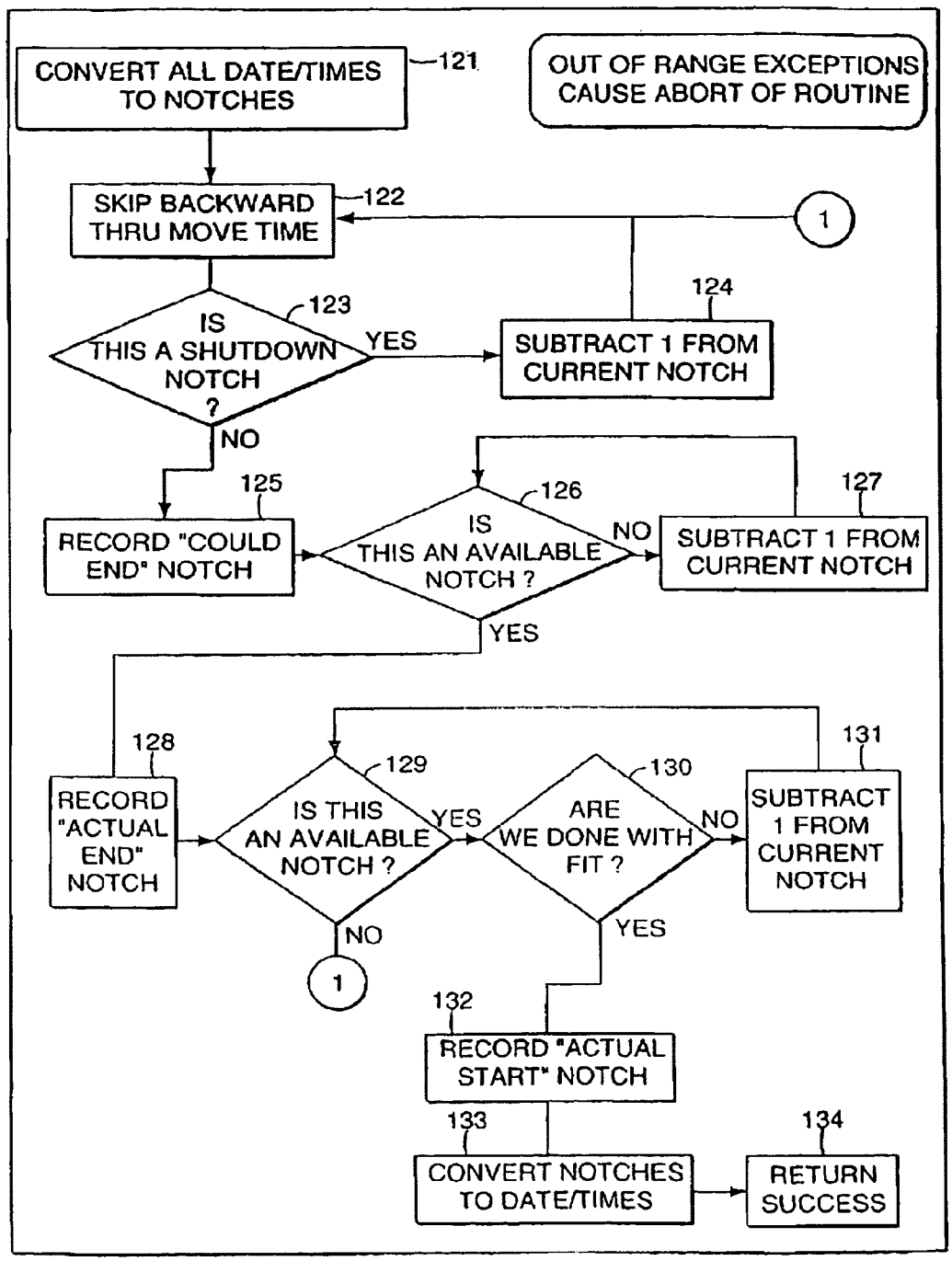
FIG. 12 illustrates other logical steps included in a computer program for implementing an embodiment of the scheduling system of the present invention.

Step 3 (Backward Scheduling) can be Broken Down into the Following Steps (FIG. 9)

a LOCATE AND PROCESS EACH OPERATION, STARTING WITH THE LAST OPERATION AND ENDING WITH THE FIRST OPERATION, EXECUTING THE FOLLOWING STEPS FOR EACH ONE (FIG. 9, BLOCK 91):

b CHECK THAT THE RESOURCE CAPACITY INFORMATION HAS BEEN LOADED FOR EACH RESOURCE REQUIRED FOR THE OPERATION; IF NOT, READ THE CAPACITY VECTOR INTO MEMORY AND INITIALIZE THE LOAD VECTOR (FIG. 9, BLOCKS 92, 93)

c DETERMINE A PROPOSED FINISH DATE/TIME FOR THE OPERATION (FIG. 9, Block 94)
  (1) for the last operation, the proposed finish date is the want date of the work order
  (2) for each preceding operation, the proposed finish date is the start date of the succeeding operation, unless a minimum move quantity is specified for the operation
  (3) if a minimum move quantity is specified for the operation, then the proposed finish date is the earlier of (a) the start date for the succeeding operation plus the time necessary to complete the operation for the minimum move quantity and (b) the finish date for the succeeding operation less the time necessary to complete the operation for the minimum move quantity d DETERMINE A PROPOSED START DATE/TIME FOR THE OPERATION (FIG. 9, BLOCK 95)
  (1) determine whether there is sufficient available capacity to complete the operation during an uninterrupted time period, consulting both the capacity vector(s) and the load vector(s) for the resource(s) needed to perform the operation
  (2) in order for an operation to be scheduled, a sequence of one or more notches must be available which have no intervening running notches with insufficient capacity to satisfy the minimum capacity specified by the work order for the main resource for the operation
  (3) each operation has, optionally, two auxiliary resources for the setup and run phases of the operation; if specified, the setup resource must be available in the same notch as the main resource during the setup phase; also, if specified, the run resource must be available in the same notch as the main resource during the run phase e DETERMINE WHETHER THE MATERIAL NEEDED FOR THE OPERATION IS AVAILABLE (FIG. 9, BLOCK 96)
  (1) by netting supply and demand, determine whether sufficient material is available on the proposed start date to satisfy the material requirement for the operation
  (2) if sufficient material is available, then the proposed start date becomes the start date
  (3) if sufficient material is not available, backward scheduling (STEP 3) is aborted and forward scheduling (STEP 5) must be performed Step 5 (Forward Scheduling) can be Broken Down into the Following Steps (FIG. 10)

a LOCATE AND PROCESS EACH OPERATION, STARTING WITH THE FIRST OPERATION AND ENDING WITH THE LAST OPERATION, EXECUTING THE FOLLOWING STEPS FOR EACH ONE (FIG. 10, BLOCK 101):

b CHECK THAT THE RESOURCE CAPACITY INFORMATION HAS BEEN LOADED FOR EACH RESOURCE REQUIRED FOR THE OPERATION; IF NOT, READ THE CAPACITY VECTOR INTO MEMORY AND INITIALIZE THE LOAD VECTOR (FIG. 10, BLOCKS 102, 103)

c c. DETERMINE A PROPOSED START DATE/TIME FOR THE OPERATION (FIG. 10, BLOCK 104)
  (1) for the first operation, the proposed start date is the release date for the work order or the current date, whichever is later
  (2) for each succeeding operation, the proposed start date is the finish date of the preceding operation, unless a minimum move quantity is specified for the preceding operation
  (3) if a Minimum Move Quantity is Specified for the Preceding Operation (either in the same leg or in an immediately preceding leg of the work order), then the proposed start date is determined by the following steps:
    (a) determine a proposed start date by adding the amount of time necessary to complete the preceding operation for the minimum move quantity to the start date for the preceding operation
    (b) determine a calculated finish date for the current operation by adding the run time for the current operation to the proposed start date
    (c) compare the calculated finish date for the current operation with the finish date (determined in step e.) for the preceding operation
    (d) if the calculated finish date for the current operation is earlier than the finish date for the preceding operation, then subtract the run time for the current operation from the finish date for the preceding operation to determine the proposed start date; otherwise, use the proposed start date determined in step (3)(a)

d DETERMINE WHETHER THE MATERIAL NEEDED FOR THE OPERATION IS AVAILABLE (FIG. 10, BLOCKS 105, 106)
  (1) by netting supply and demand, determine whether sufficient material is available on the proposed start date to satisfy the material requirement for the operation
  (2) if sufficient material is available, then the proposed start date becomes the start date
  (3) if sufficient material is not available, then load the lead time for obtaining additional material into memory
  (4) if the lead time is greater than the difference between the current date and the proposed start date, then add the excess to the proposed start date to determine the start date
  (5) if the lead time is less than or equal to the difference between the current date and the proposed start date, then the proposed start date becomes the start date e DETERMINE A FINISH DATE/TIME FOR THE OPERATION (FIG. 10, BLOCK 107)
  (1) determine whether there is sufficient available capacity to complete the operation during an uninterrupted time period, consulting both the capacity vector(s) and the load vector(s) for the resource(s) needed to perform the operation
  (2) in order for an operation to be scheduled, a sequence of one or more notches must be available which have no intervening running notches with insufficient capacity to satisfy the minimum capacity specified by the work order for the main resource for the operation
  (3) each operation has, optionally, two auxiliary resources for the setup and run phases of the operation; if specified, the setup resource must be available in the same notches as the main resource during the setup phase; also, if specified, the run resource must be available in the same notches as the main resource during the run phase Step 7 is Broken Down into the Following Steps (FIG. 11)
a LOCATE AND PROCESS THE NON-DETERMINANT OPERATIONS, STARTING WITH THE LAST NON-DETERMINANT OPERATION AND ENDING WITH THE FIRST, EXECUTING THE FOLLOWING STEP FOR EACH ONE (FIG. 11, BLOCKS 111, 112):
  (1) a non-determinant operation is one that is not on the determinant (or critical) path.
b IF POSSIBLE, SHIFT THE OPERATION TO THE LATEST AVAILABLE NOTCH USING THE SAME UNIT OF CAPACITY (FIG. 11, BLOCKS 113, 114)

Scheduling a Single Operation

The process of determining a start date (STEP 3.d.) or a finish date (STEP 5.e.) for an operation will now be explained in greater detail.

The process of determining a start date or finish date for an operation assumes the availability, in the memory of the computer, of a capacity vector and a load vector for the main resource, the setup resource, and the run resource; the proposed finish date (STEP 3) or proposed start date (STEP 5) for the operation; the units of capacity required at each resource; and the run time, setup time, and transfer time, in minutes, for the operation.

Determining a Start Date/Time when Traversing the Work Order in the Backward Direction—Step 3.d can be Broken Down into the Following Steps (FIG. 12)
1. CONVERT THE PROPOSED FINISH DATE/TIME TO A RELATIVE NOTCH (i.e., THE nth notch from beginning of capacity vector, which starts at midnight on the current date)—THIS BECOMES THE "CURRENT NOTCH;" CONVERT TIME PERIODS TO NOTCHES (FIG. 12, BLOCK 121)
2. STARTING FROM THE "CURRENT NOTCH," SKIP NOTCHES FOR THE TRANSFER TIME—THIS BECOMES THE NEW "CURRENT NOTCH" (FIG. 12, BLOCK 122)
3. SEARCH BACKWARD FROM THE "CURRENT NOTCH" FOR THE FIRST RUNNING (NON-SHUTDOWN) NOTCH FOR THE MAIN RESOURCE; NOTE THIS NOTCH AS THE "COULD END NOTCH"—THIS BECOMES THE NEW "CURRENT NOTCH" (FIG. 12, BLOCKS 123, 124, 125)
4. SEARCH BACKWARD FROM THE "CURRENT NOTCH" FOR THE FIRST AVAILABLE RUNNING NOTCH FOR ALL RESOURCES REQUIRED; NOTE THIS NOTCH AS THE "ACTUAL END NOTCH"—THIS BECOMES THE NEW "CURRENT NOTCH" (FIG. 12, BLOCKS 126, 127, 128)
5. SEARCH BACKWARD FROM THE "CURRENT NOTCH" COUNTING ALL AVAILABLE NOTCHES FOR THE MAIN RESOURCE; VERIFY THAT THE SAME NOTCH IS AVAILABLE FOR THE SETUP AND RUN RESOURCES, IF APPLICABLE; WHEN THE NUMBER OF NOTCHES SPECIFIED BY THE SETUP TIME AND RUN TIME MATCHES THE NUMBER OF NOTCHES ASSIGNABLE, END THE SEARCH; NOTE THIS NOTCH AS THE "ACTUAL START NOTCH" (FIG. 12, BLOCKS 129, 130, 131, 132)
6. CONVERT ALL NOTCHES TO DATES/TIMES (FIG. 12, BLOCK 133)
7. RETURN RESULT OF SCHEDULE (FIG. 12, BLOCK 134)
8. IF AT ANY TIME THE BOUNDARIES OF THE SCHEDULE (i.e., the current date) ARE EXCEEDED, ABORT THE SCHEDULING ROUTINE AND REPORT THE APPROPRIATE RESULT Determining a Finish Date/Time when Traversing the Work Order in the Forward Direction—Step 5.e can be Broken Down into the Following Steps
1. CONVERT PROPOSED START DATE/TIME TO A RELATIVE NOTCH (i.e., the n.sup.th notch from beginning of capacity vector, which starts at midnight on the current date)—THIS BECOMES THE "CURRENT NOTCH;" CONVERT TIME PERIODS TO NOTCHES
2. SEARCH FORWARD FROM THE "CURRENT NOTCH" FOR THE FIRST RUNNING (NON-SHUTDOWN) NOTCH FOR THE MAIN RESOURCE; NOTE THIS NOTCH AS THE "COULD START NOTCH"—THIS BECOMES THE NEW "CURRENT NOTCH"
3. SEARCH FORWARD FROM THE "CURRENT NOTCH" FOR THE FIRST AVAILABLE RUNNING NOTCH FOR ALL RESOURCES REQUIRED; NOTE THIS NOTCH AS THE "ACTUAL START NOTCH"—THIS BECOMES THE NEW "CURRENT NOTCH"
4. SEARCH FORWARD FROM THE "CURRENT NOTCH" COUNTING ALL AVAILABLE NOTCHES FOR THE MAIN RESOURCE; VERIFY THAT THE SAME NOTCH IS AVAILABLE FOR THE SETUP AND RUN RESOURCES, IF APPLICABLE; WHEN THE NUMBER OF NOTCHES SPECIFIED BY THE SETUP TIME AND RUN TIME MATCHES THE NUMBER OF NOTCHES ASSIGNABLE, END THE SEARCH
5. SKIP NOTCHES FOR THE TRANSFER TIME; NOTE THIS NOTCH AS THE "ACTUAL END NOTCH"
6. CONVERT ALL NOTCHES TO DATES/TIMES
7. RETURN RESULT OF SCHEDULE
8. IF AT ANY TIME THE BOUNDARIES OF THE SCHEDULE ARE EXCEEDED, ABORT THE SCHEDULING ROUTINE AND REPORT THE APPROPRIATE RESULT Determination of Run Time and Material Requirements for Each Operation As explained above, the run time, the quantity of materials needed for each operation, and the scrap or yield rates are preferably expressed as a function of the number of units of input to the operation or the number of units of output from the operation. According to a preferred embodiment of the scheduling system of the invention, prior to scheduling the operations of a work order, the run time and material requirement for each operation in the work order are calculated in absolute terms using the input or output quantities for each operation. Based upon the quantity specified by the work order and the scrap or yield definitions, the input or output quantities and material requirement for each operation are determined by the following process prior to scheduling:
1. TRAVERSE THE OPERATIONS OF THE WORK ORDER IN THE BACKWARD DIRECTION, EXECUTING THE FOLLOWING STEPS FOR EACH ONE:
2. DETERMINE AN OUTPUT QUANTITY
  a for the last operation, the work order quantity is the output quantity
  b for each preceding operation, the output quantity is the input quantity for the succeeding operation
3. DETERMINE AN INPUT QUANTITY
  a the start quantity is a quantity which when reduced by the scrap rate and scrap amounts yields the input quantity for the operation
4. DETERMINE MATERIAL REQUIREMENT
  a the absolute quantity of each material needed for an operation is determined by multiplying the material requirement (a quantity per unit of input or output) by the input or output quantity determined in step 2 or 3, plus any scrap rate and/or amount specified by the user; (this scrap rate/amount is independent of the scrap rate/amount used in step 3)

The preferred embodiment of the scheduling system of the invention determines the following information: (1) start date and finish date for each operation, ignoring any capacity limitations; (2) start date and finish date for each operation, taking into account all capacity limitations; and (3) identity of the assigned main resource, setup resource, and run resource. The assigned start date, assigned finish date and assigned resource capacity are displayed on a computer screen in a graphical format. In a preferred embodiment of the invention, this information is displayed in the form a bar graph.

Figure 7:
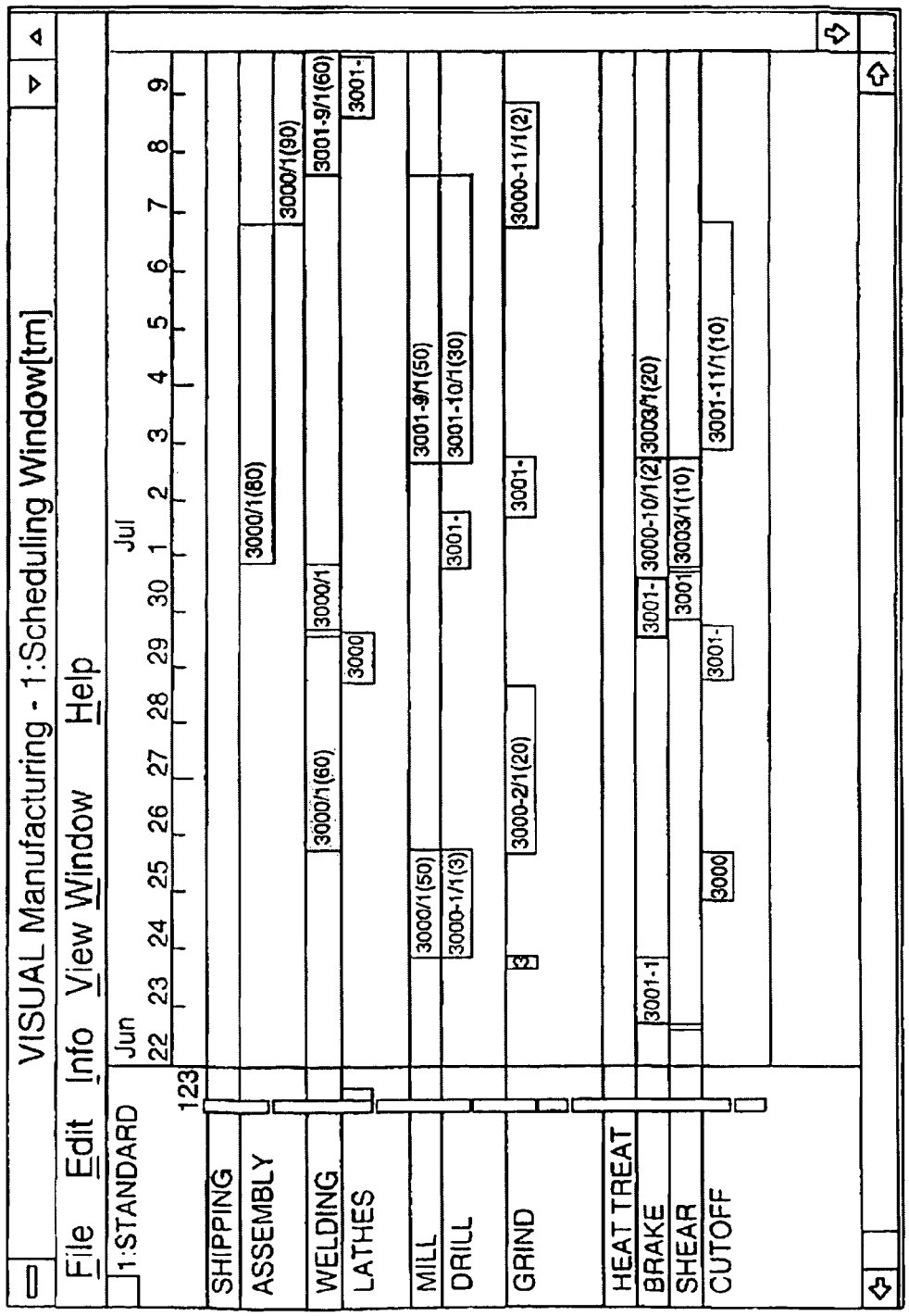
FIG. 7 illustrates a preferred embodiment of a screen display showing a schedule generated by the scheduling system of the invention.

FIG. 7 illustrates a preferred embodiment of a screen display showing a schedule generated by the scheduling system of the invention. The current month and days of the month are shown along the x-axis in FIG. 7, and the various resources that are used in the manufacturing process are shown along the y-axis. Only those resources at which operations have been scheduled are included in the screen display. The time frame that is displayed on the computer screen may be varied. For example, the user may elect to display all operations scheduled during a one week period or, alternatively, all operations scheduled during a one month period.

A preferred embodiment of the scheduling system of the invention is capable of displaying more than one schedule on a single screen. Multiple schedules may be created by the system based on different resource capacity calendars defined by the user. For example, a first schedule could be created based upon the availability of three machine operators working in a particular shift, and a second schedule could be created based upon the availability of five machine operators in that shift. The scheduling advantage of this increase in machine operator capacity could be evaluated by displaying the first and second schedules on a computer screen simultaneously.

While a preferred embodiment of the invention has been disclosed in detail, it will be appreciated by those skilled in the art that other embodiments of the invention within the scope of the following claims may be developed based on the principles disclosed herein.

We claim:

1. A method for scheduling a plurality of work orders for manufacturing products, each work order including operations to be performed using a plurality of resources and materials in a manufacturing process, the method comprising:
   obtaining resource availability information and material availability information for the manufacturing process for each work order, the material availability information comprising, for each material used in the manufacturing process for each work order, an identity of the each material, dates when the each material is available, and a quantity of the each material available on each of a plurality of dates;
   obtaining work order information comprising date information for each work order; and
   scheduling operations to be performed for each work order based on the resource availability information and the material availability information, wherein scheduling the operations comprises, for each work order, scheduling the plurality of resources based on the resource availability information and the material availability information, wherein the plurality of resources comprises a main resource and at least one auxiliary resource.

2. The method according to claim 1, wherein the resource availability information comprises, for each resource used in the manufacturing process for each work order, an identity of the each resource, the available capacity for the each resource, and dates when the each resource capacity is available.

3. The method according to claim 1, wherein the work order information further comprises, for each work order, at least one identity of a product to be manufactured, a quantity of the product to be manufactured, and a relative priority for the each work order.

4. The method according to claim 1 further comprising the step of displaying on a computer screen selected work order information.

5. The method according to claim 1, wherein the work order information further comprises, for each work order, operations information and material requirements information, the operations information comprising a minimum resource capacity needed to perform each operation and a maximum resource capacity that could be used to perform the each operation, and the material requirements information comprising an identify of materials needed for the each operation and a quantity of materials needed for the each operation, and
   wherein scheduling the operations comprises, for each work order, scheduling the plurality of resources based on the resource availability information, the material availability information, the operations information, and the material requirements information.

6. The method according to claim 1, wherein the work order information, for each work order, further comprises a relative priority for work to be performed, wherein scheduling the operations for each work order further comprises scheduling the each work order based on an order of relative priority for the plurality of work orders.

7. The method according to claim 1, wherein:
   the work order information, for each work order, comprises an identity of one or more operations to be completed and operations information comprising an identity in the work order information of the one or more operations to be completed and a sequence of the one or more operations defined in the work order information.

8. The method according to claim 1, wherein the at least one auxiliary resource comprises a set-up resource and a run resource.

9. A system for scheduling a plurality of work orders for manufacturing products, each work order comprising a set of operations to be performed using a plurality of resources and materials in a manufacturing process, the system comprising:
   means for obtaining resource availability information and material availability information for the manufacturing process for each work order, the material availability information comprising, for each material used in the manufacturing process for each work order, an identity of the each material, the dates when the each material is available, and the quantity of the each material available on each of a plurality of dates;
   means for obtaining work order information comprising date information for each work order; and
   means for scheduling operations to be performed for each work order based on the resource availability information and the material availability information, wherein scheduling the operations comprises, for each work order, scheduling the plurality of resources based on the resource availability information and the material availability information.

10. The system according to claim 9, wherein the resource availability information comprises, for each resource used in the manufacturing process for each work order, an identity of the each resource, the available capacity for the each resource, and the dates when the each resource capacity is available.

11. The system according to claim 9 further comprising means for displaying on a computer screen selected material availability information.

12. The system according to claim 9, wherein the work order information further comprises, for each work order, at least one of an identity of a product to be manufactured, a quantity of the product to be manufactured, and a relative priority for the each work order.

13. The system according to claim 9, further comprising means for displaying on a computer screen selected work order information.

14. The system according to claim 9, wherein the work order information further comprises, for each work order, operations information and material requirements information, the operations information comprising a minimum resource capacity need to perform each operation and, wherein the system further comprises:
    an assigning means for assigning a maximum resource capacity to the each operation if the maximum resource capacity is available, and
    means for assigning a resource capacity not less than the minimum resource capacity to the each operation if the maximum resource capacity is not available.

15. The system according to claim 9, wherein the work order information, for each work order, further comprises a relative priority, and said scheduling means are further for scheduling an order of the operations for the each work order based on an order of the relative priority for the each work order.

16. The system according to claim 9, wherein:
    the work order information, for each work order, comprises an identify of one or more operations to be completed and operations information comprising an identity in the work order information of the one or more operations to be completed and a sequence of operations of the one or more operations defined in the work order information.

17. The method according to claim 9, wherein the plurality of resources comprises a set-up resource and a run resource.

18. A system for scheduling a plurality of work orders for manufacturing products, each work order comprising a set of operations to be performed using a plurality of resources and materials in a manufacturing process, the system comprising:
    a resource and material availability module configured to obtain resource availability information and material availability information for the manufacturing process for each work order, the material availability information comprising, for each material used in the manufacturing process for each work order, an identity of the each material, dates when the each material is available, and a quantity of the each material available on each of a plurality of dates;
    a work order information module configured to obtain work order information comprising date information for each work order;
    a scheduler configured to schedule operations to be performed for each work order based on the resource availability information and the material availability information, wherein scheduling the operations comprises, for each work order, scheduling the plurality of resources based on the resource availability information and the material availability information; and
    an interface configured to provide an assigned resource capacity and scheduling for each operation in each work order.

19. The system according to claim 18, wherein the resource availability information comprises, for each resource used in the manufacturing process for each work order, an identity of the each resource, the available capacity for the each resource, and dates when the each resource capacity is available.

20. The system according to claim 18 wherein the interface comprises a computer screen for displaying selected work order information.

21. The system according to claim 18, wherein the work order information further comprises, for each work order, at least one identity of a product to be manufactured, a quantity of the product to be manufactured, and a relative priority for the each work order.

22. The system according to claim 18, wherein the scheduler is configured to generate, for each work order, operations information and material requirement information, the operations information comprising a minimum resource capacity needed to perform each operation and a maximum resource capacity that could be used to perform the each operation, and the material requirements information comprising an identity of materials needed for the each operation and a quantity of materials needed for the each operation, and
    wherein the scheduler is further configured, for each work order, to schedule the plurality of resources based on the resource availability information, the material availability information, the operations information, and the material requirements information.

23. The system according to claim 18, wherein the work order information, for each work order, further comprises a relative priority, wherein the scheduler is further configured to schedule an order of the operations based on an order of the relative priority for each work order.

24. The system according to claim 18, wherein the work order information, for each work order, comprises an identity of one or more operations to be completed and operations information comprising an identity in the work order information of the one or more operations to be completed and a sequence of the one or more operations defined in the work order information.

25. The method according to claim 18, wherein the plurality of resources comprises a set-up resource and a run resource.

* * * * *